United States Patent

[11] 3,596,081

[72] Inventor Peter W. Higgins
    Houston, Tex.
[21] Appl. No. 821,721
[22] Filed May 5, 1969
[45] Patented July 27, 1971
[73] Assignee Tideland Signal Corporation
    Houston, Tex.

[54] APPARATUS FOR LEVELING THE LENS OF A MARINE LANTERN
    13 Claims, 6 Drawing Figs.
[52] U.S. Cl. .................................................. 240/7.5,
    240/25, 240/26, 240/41.6, 240/61.05, 240/68
[51] Int. Cl. ........................................................ B63b 45/04
[50] Field of Search ........................................... 240/7.5, 25,
    26, 41.6, 44, 61, 61.05, 67, 68, 151; 33/69, 211

[56] References Cited
    UNITED STATES PATENTS
1,010,339 11/1911 Angel ........................... 33/69
3,190,010 6/1965 Johnson ........................ 33/211
3,194,956 7/1965 Troccoli ........................ 240/25
3,385,258 5/1968 Curtin et al. .................. 240/25

Primary Examiner—Samuel S. Matthews
Assistant Examiner—E. M. Bero
Attorneys—James F. Weiler, Jefferson D. Giller, William A. Stout, Paul L. De Verter, II, Dudley R. Dobie, Jr. and Henry W. Hope ABSTRACT: An apparatus for mounting the focal plane of the lens of a marine lantern in a horizontal plane by mounting two spirit levels directly to the lens approximately 90° apart to indicate the levelness of the lens, and providing a leveling adjustment between the lens and the lantern support to adjust and maintain the light from the lens in a horizontal direction. A marine lantern lens adjustment means having at least three threaded bolts connected between the support and the lantern base and two nuts on each bolt adjusting the level of and securing the base to the bolts.

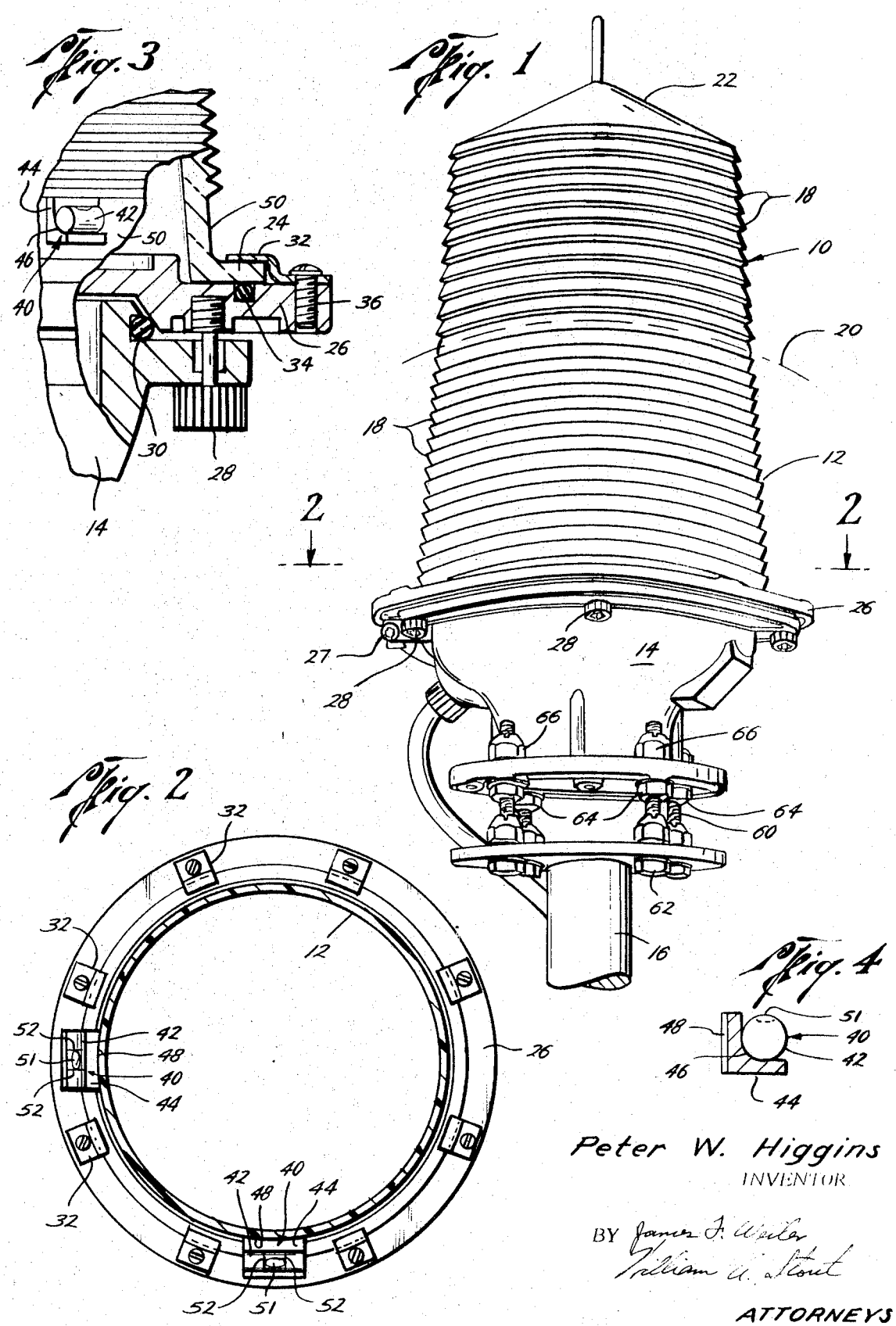

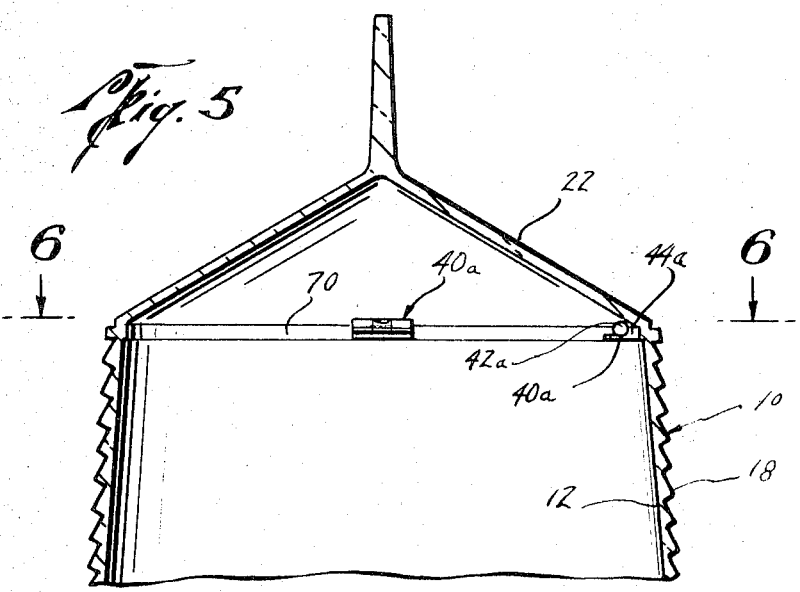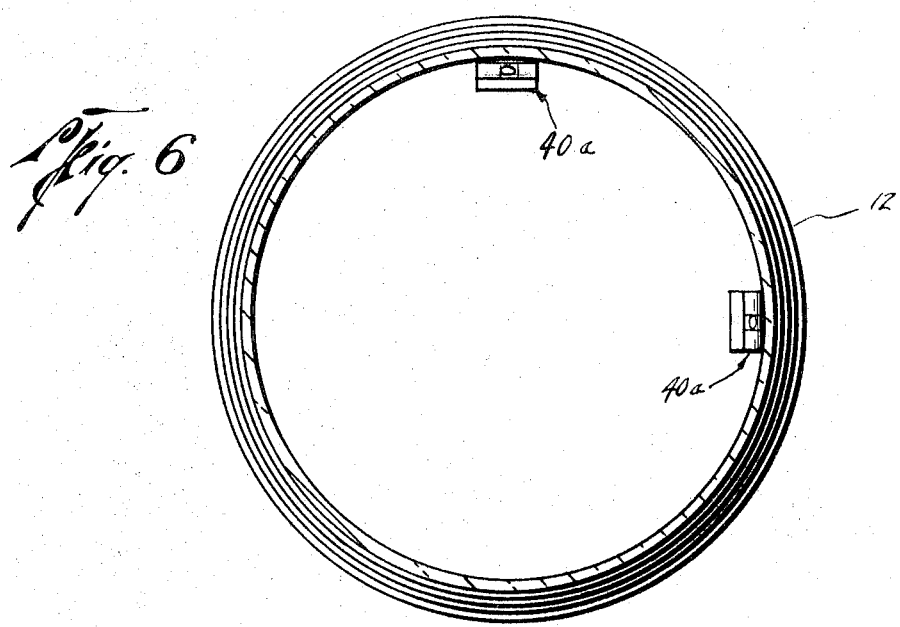

APPARATUS FOR LEVELING THE LENS OF A MARINE LANTERN

BACKGROUND OF THE INVENTION

Generally, the lens of modern marine lanterns are precision made, and generally have a rather narrow beam in order to provide a visual signal on a small amount of power at great distances. For instance, lanterns are capable of providing a light signal for 5 miles on a battery operated unit. However, if the optic system of the lantern is off one degree from horizontal, the candle power output from that lantern for certain lens-lamp conditions will drop below the limits required by law.

It has been the present practice to utilize a circular spirit level on the base of a marine lantern and provide shims when necessary for leveling the lantern. Such a structure has been unsatisfactory as the level was not sufficiently visible nor accurate enough. Also the base flange is generally somewhat unlevel and since both the lens flange and the base flange are clamped tightly together and to the base to weatherproof the lantern this causes a warping of the flanges with the result that the base has no precise relationship to the optic of the lens and thereby prevents any accurate mounting of the lens optic system in a level position.

SUMMARY

The present invention is directed to providing an apparatus to provide precise leveling and mounting of the optic system of a marine lantern by mounting two levels directly to the lens surface thereby avoiding any leveling errors caused by warpage and misalignment of the other lantern components. By mounting levels directly to the lens, the lens, which is the important part of the marine lantern as far as the light beam is concerned, can then be leveled with the required accuracy to assure that the light beam from the lantern is accurately directed.

Another feature of the present invention is the provision of a leveling adjustment means positioned between the lantern support and the lantern base for leveling the lens in accordance with the indication of the levels in which the leveling adjustment includes at least three threaded bolts connected between the support and the base and two nuts on each bolt for adjusting the level of and securing the base to the bolts.

Another feature of the present invention is the provision of mounting a pair of spirit levels each including a bubble vial and a bracket with the bracket having a contour on one side for supporting the vial and including a contour on another side for coacting with the surface of the lens, the vials being glass, the brackets and lens being of the same material, such as acrylic, in which the bracket is bonded to the lens by a solvent for providing permanent fixed nonmovable and tampering-proof installation.

BRIEF DESCRIPTION OF THE DRAWING

FIG. 1 is a perspective elevational view showing the installation of a marine lantern utilizing the present invention, FIG. 2 is a cross-sectional view taken along the line 2–2 of FIG. 1, FIG. 3 is an enlarged fragmentary view, partly in cross section, showing the mounting of the level on the lens, FIG. 4 is an enlarged cross-sectional view through a level, FIG. 5 is a fragmentary cross-sectional view illustrating a different mounting position for the levels on the lens, and FIG. 6 is a cross-sectional view taken along the line 6–6 of FIG. 5.

DESCRIPTION OF THE PREFERRED EMBODIMENT

Referring now to FIG. 1, the reference numeral 10 generally indicates a marine lantern such as used to mark buoys, navigational structures, and obstructions and generally includes a lens 12, a base 14, and a support 16.

The lens includes a suitable configuration for directing light therefrom from a lamp (not shown) in a horizontal plane and may be of any suitable material such as acrylic plastic having a plurality of lens elements 18 on the outer surface thereof and which is precisely made so that the lens 12 has an optical system to provide a narrow beam of light therefrom emanating horizontally in all directions from a focal plane 20. The lens 12 includes an enclosed top 22 and a flange 24 at its bottom.

As best seen in FIG. 3, the base 14 includes a flange 26 which is pivotally mounted at pivot 27 with the base flange 26 being secured to the base 14 by a plurality of thumbscrews 28 against a base gasket 30 to provide a weatherproof seal. In addition, the base flange 26 includes a plurality of clamps 32 around its periphery which engage the lens flange 24 for securing the lens flange against a lens ring gasket 34 by means of threaded screws 36 for maintaining a weatherproof seal between the lens flange 24 and the base flange 26.

Generally, the base 14 is not as precisely made as the lens 12. And upon tightly securing the thumbscrews 28 and screws 36 to clamp the lens flange 24 to the base flange 26 which in turn is clamped securely to the base 14 to provide a weatherproof unit, the flanges 24 and 26 will be subjected to bending and some degree of warping so that the base 14 does not have a precise geometric relationship with the optics of the lens 12. Thus the base 14 cannot be used as an accurate measure of levelness of the lantern 10 when considering that the optics of the lens for certain lens-lamp conditions will not meet the required light output standards if the focal plane 20 of the lens 12 is out of the horizontal plane by as much as 1°.

In order to precisely level the lens 12, the present invention is directed to providing a pair of spirit levels generally indicated by the reference numeral 40 and each including a bubble vial 42 and a bracket 44. The bracket 44 has a contour 46 on one side for coacting with and supporting the bubble vial 42 and a contour 48 on another side for coacting with an easily visible surface of the lens 12 such as a flat annular lens surface 50 between the lens element 18 and the flange 24. The bubble vial 42 is a conventional bubble vial having a suitable liquid and air bubble 51 therein with the usual indicating lines 52 marked thereon to provide an indication when the vial 42 is level. Preferably, the vial 42 is glass and the bracket is of a similar material compatible with the lens 12, both being, for example, an acrylic plastic. The vial 42 is secured to the bracket 44 preferably by bonding with an epoxy adhesive. The bracket 44 is fixedly secured preferably to the exterior of the lens 12 at 50, preferably by bonding with a solvent, for instance an acrylic solvent such as methylene chloride, if the materials to be joined are acrylic. This provides a quick installation of the bracket, generally less than a minute, to the lens 12 without distorting the lens or warping the connection as might be the case with other cements and provides an integral and fixed connection of the spirit level 40 to the component which is required to be precisely level, that is the lens 12. It is to be noted that the two spirit levels 40 are positioned in a generally horizontal plane at approximately 90° from each other thereby indicating the levelness of the lens 12 in all directions in a horizontal plane.

However, as best seen in FIG. 1, in order to utilize the levels 40, leveling adjustment means are positioned between the support 16 and the lantern base 14 for leveling the lens 12 in accordance with the indication of the levels 40. Preferably, the level adjustments include at least three and preferably four threaded bolts 60 connected at one end 62 to the support 16 and provided at the other end with adjusting nuts 64 on the bottom of the base for adjusting the base in accordance with the levels 40 and including locking nuts 66 for holding the base in position after it has been suitably leveled. Thus, by means of the bolts 60, adjusting nuts 64 and locking nuts 66 the base and thus the lens 12 may be suitably adjusted until the spirit levels 40 indicate that the lens and thus the lantern optic system is precisely in a horizontal position thereby insuring that the light emanating from the lantern 10 will be directed horizontally and serve its intended purpose.

While the placement of the levels 40 on the exterior of the lens 12 as shown in FIGS. 1—4 is preferred since the levels 40 are easily visible to the person adjusting the levelness of the lens 12 by the adjusting nuts 64 and locking nuts 66, the levels 40 may be placed at other locations on the lens 12. For example, and referring to FIGS. 5 and 6, levels 40a may be located on the inside of the lens 12 adjacent the top 22. Thus the vials 42a are mounted on a bracket 44a which in turn are mounted preferably to a ridge 70 on the top 22 approximately 90° apart. Since the top 22 is transparent, the levels 40a are visible therethrough, and the placement on the interior of the lens 12 protects the levels 40a and discourages tampering.

In use, the base 14 may be easily placed into position on threaded bolts 60 and the position of the nuts 64 and 66 adjusted while the installer checks the spirit levels 40 or 40a to insure that the lens 12 is leveled precisely. And since the levels 40 or 40a are easily visible, maintenance men when periodically checking the installation may quickly observe the spirit levels 40 or 40a and easily adjust the leveling adjustment with merely a wrench if necessary to realign the level of lens 12.

The present invention, therefore, is well adapted to carry out the objects and attain the ends and advantages mentioned as well as others inherent therein.

What I claim is:

1. In combination with a marine lantern having a lens for directing light in a horizontal direction, a flange on the bottom of the lens, a base for supporting said lens and having a base flange for sealably coacting with the lens flange, and a support, an apparatus for leveling said lens comprising, a pair of levels fixedly secured to the lens at a position above and spaced from the lens flange, said levels being spaced approximately 90° away from each other thereby indicating the levelness of the lens, and leveling adjustment means positioned between the support and the base for leveling the lens.

2. The apparatus of claim 1 wherein the levels each including a bubble vial and a bracket, the bracket having a contour on one side for supporting the vial and having a contour on another side for coacting with the lens wherein the bracket and the lens are plastic and bonded together by a solvent.

3. The apparatus of claim 2 wherein the plastic is acrylic and the solvent is methylene chloride.

4. The apparatus of claim 1 wherein the leveling adjustment includes, at least three threaded bolts connected between the support and the base, and two nuts on each bolt for adjusting the level of and securing the base to the bolts.

5. The apparatus of claim 1 wherein the levels are secured to the exterior of the lens adjacent the lens flange.

6. The apparatus of claim 1 wherein the levels are secured to the interior of the lens adjacent the top of the lens.

7. In combination with a marine lantern having a lens having a horizontal focal plane for directing light in a horizontal plane, a flange on the bottom of the lens, a base for supporting said lens and having a base flange for sealably coacting with the lens flange, and a support, an apparatus for leveling said lens comprising, a pair of spirit levels each including a bubble vial and a bracket, the bracket having a contour on one side for supporting the vial and having a contour on another side for coacting with a surface of the lens, said vials bonded securely to a bracket and said brackets bonded securely to the lens at a position above and spaced from the lens flange, said levels being spaced approximately 90° away from each other in a plane parallel to the lens focal plane thereby indicating the levelness of the lens in all directions in a horizontal plane, and leveling adjustment means positioned between the support and the base for leveling the lens.

8. The apparatus of claim 7 wherein the leveling adjustment includes, at least four threaded bolts connected between the support and the base, and two nuts on each bolt for adjusting the level of and securing the base to the bolts.

9. The apparatus of claim 7 wherein the bracket and the lens are plastic and are bonded together by a solvent.

10. The apparatus of claim 7 wherein the plastic is acrylic and the solvent is methylene chloride.

11. The apparatus of claim 7 wherein the lens and the bracket are an acrylic plastic and the vial is glass, and the bracket is bonded to the lens by an acrylic solvent.

12. The apparatus of claim 7 wherein the levels are secured to the exterior of the lens adjacent the lens flange.

13. The apparatus of claim 7 wherein the levels are secured to the interior of the lens adjacent the top of the lens.